(12) United States Patent
Galluzzi et al.

(10) Patent No.: US 11,643,013 B2
(45) Date of Patent: May 9, 2023

(54) METHOD OF INTEGRATING CAMERAS IN MOTOR VEHICLES, CORRESPONDING SYSTEM, CIRCUIT, KIT AND MOTOR VEHICLE

(71) Applicant: STMicroelectronics S.r.l., Agrate Brianza (IT)

(72) Inventors: Alessandro Vittorio Galluzzi, San Giuliano Milanese (IT); Riccardo Parisi, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 249 days.

(21) Appl. No.: 16/765,794

(22) PCT Filed: Jul. 12, 2018

(86) PCT No.: PCT/IB2018/055139
§ 371 (c)(1),
(2) Date: May 20, 2020

(87) PCT Pub. No.: WO2019/025887
PCT Pub. Date: Feb. 7, 2019

(65) Prior Publication Data
US 2021/0370828 A1 Dec. 2, 2021

(30) Foreign Application Priority Data
Aug. 1, 2017 (IT) ........................ 102017000088321

(51) Int. Cl.
*B60R 1/00* (2022.01)
*B60R 11/04* (2006.01)
(Continued)

(52) U.S. Cl.
CPC ................ *B60R 1/00* (2013.01); *B60R 11/04* (2013.01); *H04N 5/38* (2013.01); *H04N 5/44* (2013.01);
(Continued)

(58) Field of Classification Search
CPC ..... B60R 1/00; B60R 11/04; B60R 2011/004; B60R 2300/10; B60R 2300/50;
(Continued)

(56) References Cited

U.S. PATENT DOCUMENTS 6,028,537 A 2/2000 Suman et al.
6,259,475 B1 7/2001 Ramachandran et al.
(Continued)

FOREIGN PATENT DOCUMENTS

AU 768275 B2 12/2003
CN 101833869 A 9/2010
(Continued)

OTHER PUBLICATIONS

Strietelmeier, Julie. "Pearl RearVision wireless rearview camera review." Apr. 20, 2017. https://the-gadgeteer.com/2017/04/20/pearl-rearvision-wireless-rearview-camera-review/ (Year: 2017).*
(Continued)

*Primary Examiner* — Farzana Hossain
(74) *Attorney, Agent, or Firm* — Seed Intellectual Property Law Group LLP

(57) ABSTRACT

A vehicle such as a motor car (V) equipped with a radio equipment (14) is provided with a rearview camera 5 (10). Video frames from the rearview camera (10) are received at the radio equipment (14) and transmitted to a mobile communication device (S) such as a smart phone equipped with a video screen (S1) so that video frames from the rearview camera (10) are displayed on the 10 video screen (S1) of the mobile communication device (S).

14 Claims, 3 Drawing Sheets

(51) Int. Cl.
*H04N 5/38* (2006.01)
*H04N 5/44* (2011.01)
*H04N 7/18* (2006.01)
*B60R 11/00* (2006.01)
*H04B 1/06* (2006.01)

(52) U.S. Cl.
CPC ............ *H04N 7/185* (2013.01); *H04N 7/188* (2013.01); *B60R 2011/004* (2013.01); *B60R 2300/10* (2013.01); *B60R 2300/50* (2013.01); *B60R 2300/8066* (2013.01); *H04B 1/06* (2013.01)

(58) Field of Classification Search
CPC ........ B60R 2300/8066; B60R 2300/70; B60R 2300/8033; B60R 2300/8046; H04N 5/38; H04N 5/44; H04N 7/185; H04N 7/188; H04B 1/06
See application file for complete search history.

(56) References Cited

U.S. PATENT DOCUMENTS

| | | | |
|---|---|---|---|
| 9,718,405 | B1 | 8/2017 | Englander et al. |
| 11,019,298 | B2* | 5/2021 | Galluzzi ................. H04N 7/18 |
| 11,025,854 | B2* | 6/2021 | Galluzzi ................. G08G 1/166 |
| 2004/0049789 | A1 | 3/2004 | Bower et al. |
| 2009/0315992 | A1 | 12/2009 | Haug |
| 2011/0169626 | A1 | 7/2011 | Sun et al. |
| 2014/0111647 | A1 | 4/2014 | Atsmon et al. |
| 2014/0163768 | A1* | 6/2014 | Purdy ............. H04N 21/41422 701/1 |
| 2014/0300740 | A1 | 10/2014 | Fujioka |
| 2015/0100633 | A1 | 4/2015 | Barrett et al. |
| 2015/0307048 | A1 | 10/2015 | Santora |
| 2016/0006922 | A1 | 1/2016 | Boudreau et al. |
| 2016/0031389 | A1 | 2/2016 | Grimm et al. |
| 2016/0034146 | A1 | 2/2016 | Daly, Jr. et al. |
| 2016/0197783 | A1 | 7/2016 | Hort et al. |
| 2016/0325680 | A1 | 11/2016 | Curtis et al. |
| 2016/0379422 | A1 | 12/2016 | Kahn |
| 2017/0072850 | A1 | 3/2017 | Curtis et al. |
| 2017/0106750 | A1 | 4/2017 | Tauchi et al. |
| 2017/0177957 | A1* | 6/2017 | Yokochi ................. G06F 3/1423 |
| 2017/0313262 | A1* | 11/2017 | Wisnia ................. H04L 65/602 |
| 2017/0339401 | A1 | 11/2017 | Mishima |
| 2017/0353698 | A1 | 12/2017 | Bai et al. |
| 2018/0251067 | A1* | 9/2018 | Elliott ....................... B60R 1/00 |
| 2018/0301095 | A1 | 10/2018 | Runyan et al. |

FOREIGN PATENT DOCUMENTS

| | | |
|---|---|---|
| CN | 102621541 A | 8/2012 |
| CN | 103303221 A | 9/2013 |
| CN | 203402061 U | 1/2014 |
| CN | 204206332 U | 3/2015 |
| CN | 204465763 U | 7/2015 |
| CN | 205059425 U | 3/2016 |
| CN | 205071197 U | 3/2016 |
| CN | 105898188 A | 8/2016 |
| CN | 105898202 A | 8/2016 |
| CN | 106469477 A | 3/2017 |
| CN | 106671922 A | 5/2017 |
| CN | 106809120 A | 6/2017 |
| CN | 206363412 U | 7/2017 |
| CN | 209290279 U | 8/2019 |
| DE | 10 2011 017 233 A1 | 8/2012 |
| DE | 10 2015 000 794 A1 | 8/2015 |
| EP | 1 211 132 A2 | 6/2002 |
| EP | 2 197 708 A1 | 6/2010 |
| FR | 2 875 049 A1 | 3/2006 |
| WO | 2007093471 A1 | 8/2007 |

OTHER PUBLICATIONS

O'Kane, Sean. "Automotive accessory startup Pearl is shutting down." Jun. 26, 2017. https://www.theverge.eom/2017/6/26/15872870/automotive-accessory-startup-pearl-is-shutting-down (Year: 2017).*

TechTime, "i4drive and Japanese Rico to develop new ADAS," May 3, 2016, retrieved from https://techtime.news/2016/05/03/adas/, 6 pages.

* cited by examiner

METHOD OF INTEGRATING CAMERAS IN MOTOR VEHICLES, CORRESPONDING SYSTEM, CIRCUIT, KIT AND MOTOR VEHICLE

TECHNICAL FIELD

The description relates to rearview (backup) cameras for motor vehicles.

One or more embodiments may apply to "after-market" or "retrofit" equipping of motor vehicles with such cameras.

TECHNOLOGICAL BACKGROUND

Rearview (or "backup") cameras are currently installed in motor vehicles as an optional feature. Legislation is under way in certain countries intended to render rearview camera a compulsory equipment for all new cars for safety reasons.

A rearview camera allows a driver, when reversing, to see an image of the area just behind a car e.g. via a camera mounted on the car rear bumper. This facilitates avoiding e.g. inadvertent pedestrian backover crashes during reversing.

Different approaches can be adopted in integrating a rearview camera (and an associated monitor) in a motor vehicle.

For instance, a rearview camera and a monitor for displaying the images from the rearview camera can be included as original vehicle equipment (OEM) installed at the factory, possibly together with touchscreen navigation features and Bluetooth for hands-free phone calls. In certain cases, a monitor can be provided as a small monitor located in a rearview mirror on the driver's side.

A vehicle not provided with such original equipment can be "retro-fitted" with a rearview camera and an associated monitor. For instance, this may occur while replacing a factory-installed radio with a smarter radio, which may have associated e.g. a GPS viewing screen which may be exploited for displaying rearview camera images when the vehicle is in reverse.

Such upgrade will normally involve a relatively high cost, possibly justified (only) by additional benefits to rearview camera alone.

Another option may include a "kit" including a rearview camera for mounting e.g. at the car plate and an associated stand-alone monitor.

Solutions are available where a smart phone can be used to display rearview camera images, e.g. by sending the rearview camera images over a WiFi connections to a specific device that redirects the frame to the smart phone.

OBJECT AND SUMMARY

Despite the activity discussed in the foregoing, improved solutions are desirable in order to address various issues.

For instance, reducing the cost of "retrofitting" an existing vehicle with a rearview camera may facilitate the diffusion of such a safety feature.

The capability of interfacing with the "infotainment" system of the vehicle (e.g. the ability of exploiting data/messages from the CAN subsystem in the vehicle) may represent another desirable feature.

An accurate installation, not easy to be tampered with, possibly certified by a qualified operator, may represent a point of interest in view of the possible "forensic" relevance of rearview camera images (e.g. for insurance purposes).

An object of one or more embodiments is to contribute in providing such an improved solution.

According to one or more embodiments, such an object can be achieved by means of a method having the features set forth in the claims that follow.

One or more embodiments may relate to a corresponding system, a corresponding circuit as well as to a corresponding kit (e.g. for use in "retro-fitting" existing vehicles) and a corresponding motor vehicle.

The claims are an integral part of the technical teaching provided herein in respect of the embodiments.

One or more embodiments make it possible to provide a vehicle with a rearview camera feature at a reduced cost (e.g. a few USD).

One or more embodiments can be associated effectively with other "aftermarket" products by making these more appealing for the final user.

One or more embodiments make it possible to provide a vehicle with a rearview camera feature with the camera representing practically the sole item to be added.

BRIEF DESCRIPTION OF THE SEVERAL VIEWS OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1:
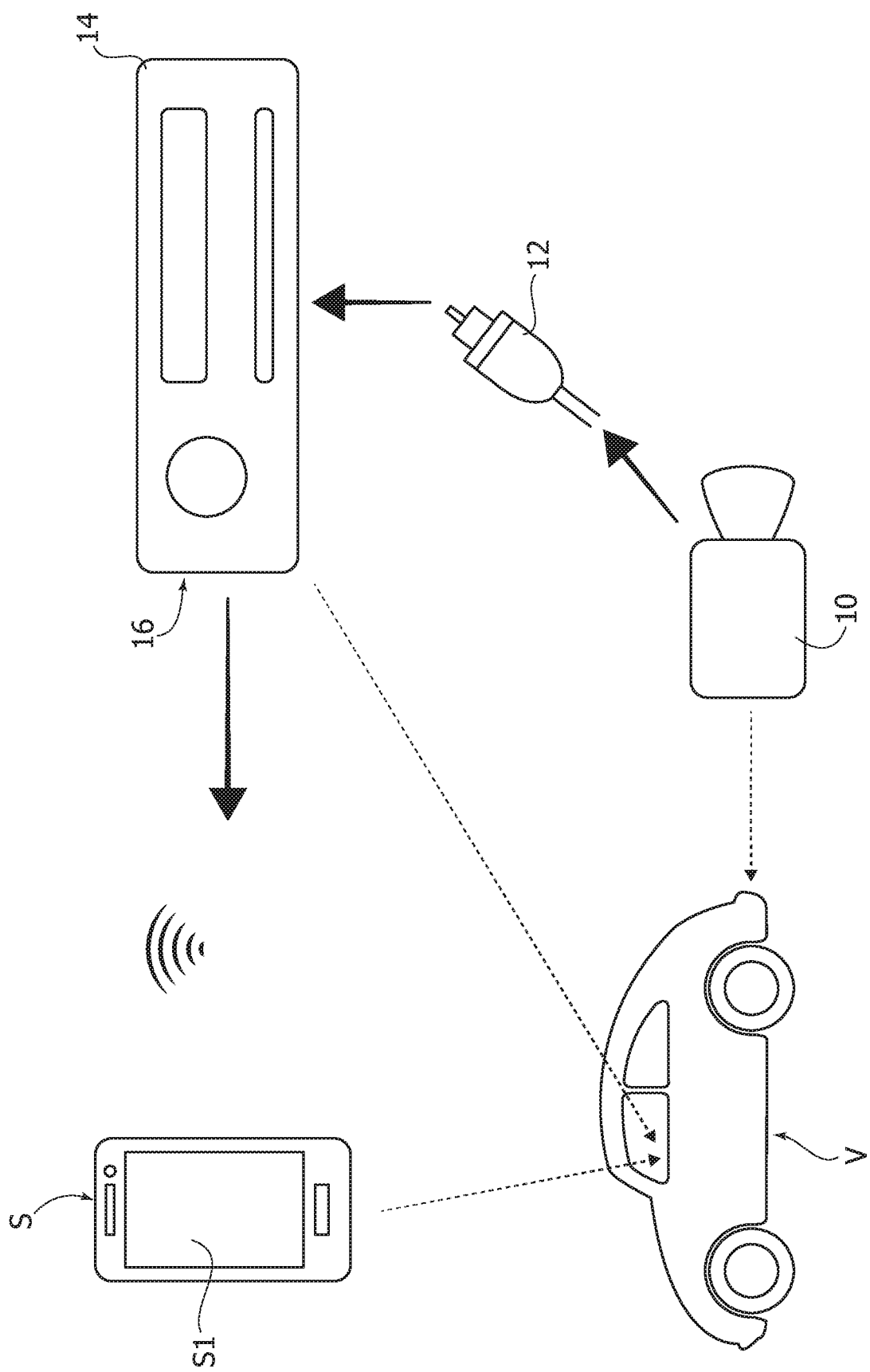
FIG. 1 is a functional diagram exemplary of embodiments.

In FIG. 1 reference V indicates a vehicle such as a motor car having installed thereon (e.g. by way of retro-fitting) a rearview ("backup") camera 10. The camera can be of any known type as already available on the market from various sources.

The camera 10 is coupled via a connection 12 to a car radio receiver 14 installed in the vehicle V and provided with a connection 16 (e.g. USB or WiFi, this latter designation being intended to be inclusive of Bluetooth connection) to a smart phone S or a similar portable device (e.g. a tablet or the like) provided with a video quality screen S1, that is a screen (e.g. a LCD screen) capable of providing adequate reproduction of video signals as produced by a rearview camera such as 10.

In one or more embodiments, the vehicle V being driven in reverse can be sensed by the radio 14. The video signals from the camera 10, which may be activated by reversing being sensed, can thus be received by the radio 14 over the connection 12 and sent towards the device S over the connections 16 to be displayed on the screen S1. For that purpose, the device S may be arranged on a support member (e.g. a support bracket in the passenger compartment) at an adequate location in the driver's field of view.

In one or more embodiments the radio 14 can be e.g. a so-called 1DIN (ISO7736) radio not equipped with an LCD display. Such a radio would per se be unable to support rearview camera use. On the other hand, 1DIN radios still represent a significant quota of OEM and aftermarket car radio systems.

One or more embodiments make it possible to bypass that limitation by using a display screen e.g. of the driver's smart phone connected via WiFi or USB to the car radio 14 (which may be already equipped with such communication features for synchronization with such a smart phone e.g. for hands-free phone calls).

In one or more embodiments, the rearview camera 10 can be installed e.g. at the rear bumper of the vehicle V to send video frames to the radio 14 over the connection 12. In one or more embodiments, an analog video decoder 10a may be associated with the camera 10 for that purpose.

In one or more embodiments, the radio 14 can receive over the connection 12 video frames generated from the rearview camera 10, e.g. using a Graphic accelerator 140 or a video input port (e.g. Accordo2 Smart Graphic Accelerator SGA) and output them e.g. as YUV frames to be sent, possibly after optional compression (e.g. at a compressor 142 such as a Cortex R4-based compressor), to the device S (e.g. a smart phone) over the connection 16.

Also, in one or more embodiments, a radio 14 such as e.g. a 1DIN radio can be (already) configured—in a manner known per se—to receive messages via a CAN subsystem or any other interface installed in the vehicle V and send to the device S corresponding messages, e.g. by using a dedicated protocol.

A Controller Area Network (CAN) bus is a known standard which enables communication between devices such as microcontrollers and other devices. While originally devised for other electrical wiring applications, it is extensively used in vehicles due e.g. to good noise immunity and the possibility of saving on copper. Also, being a message-based approach, a host computer is not required.

In one or more embodiments, the device S (hereinafter a smart phone will be mostly referred to for simplicity) can receive from the car radio 14 over the connection 16 video frames generated from the rearview camera 10, optionally de-compress them, and display them on the screen S1.

In one or more embodiments, the device S can also decode messages coming from the radio 14 about the reverse status as sensed—in manner known per se—at the radio 14.

It will be otherwise appreciated that the device S may per se be distinct from one or more embodiments.

The device S may simply be a mobile communications device ("user equipment") including a video-quality screen (e.g. a smart phone, a tablet, a watch or any other type of portable/wearable device) as carried/worn by a driver capable of and configured—in a manner known per se—for receiving from the radio 14 video frames generated from the rearview camera 10 and displaying them on the screen S1.

Various (identical or different) options can be considered for both connections 12 and 16.

In one or more embodiments, the connection 12 of the camera 10 to the radio 14 may include a RCA connector (composite video)

In one or more embodiments, the connection 12 of the camera 10 to the radio 14 may be in compliance with the ITU-R BT 656 standard.

While not mandatory, in one or more embodiments, the connection 12 of the camera 10 to the radio 14 may include a wired connection. This may facilitate installation being entrusted to a qualified operator, also in view of possible certification. Also such a wired connection, included in the vehicle "harness", may be less exposed to undesired tampering.

In one or more embodiments, the connection 16 of the radio 14 to the device (smart phone) 10 may include a USB or WiFi (e.g. Bluetooth) connection.

While not mandatory, in one or more embodiments, such connection 16 may exploit a communication channel already provided (e.g. for hands-free phone calls).

In one or more embodiments a rearview camera application ("app") can be loaded to the smart phone 10 to be triggered when the reverse gear is activated. This condition can be sensed by the radio 14 by being connected to the vehicle CAN subsystem.

Figure 2:
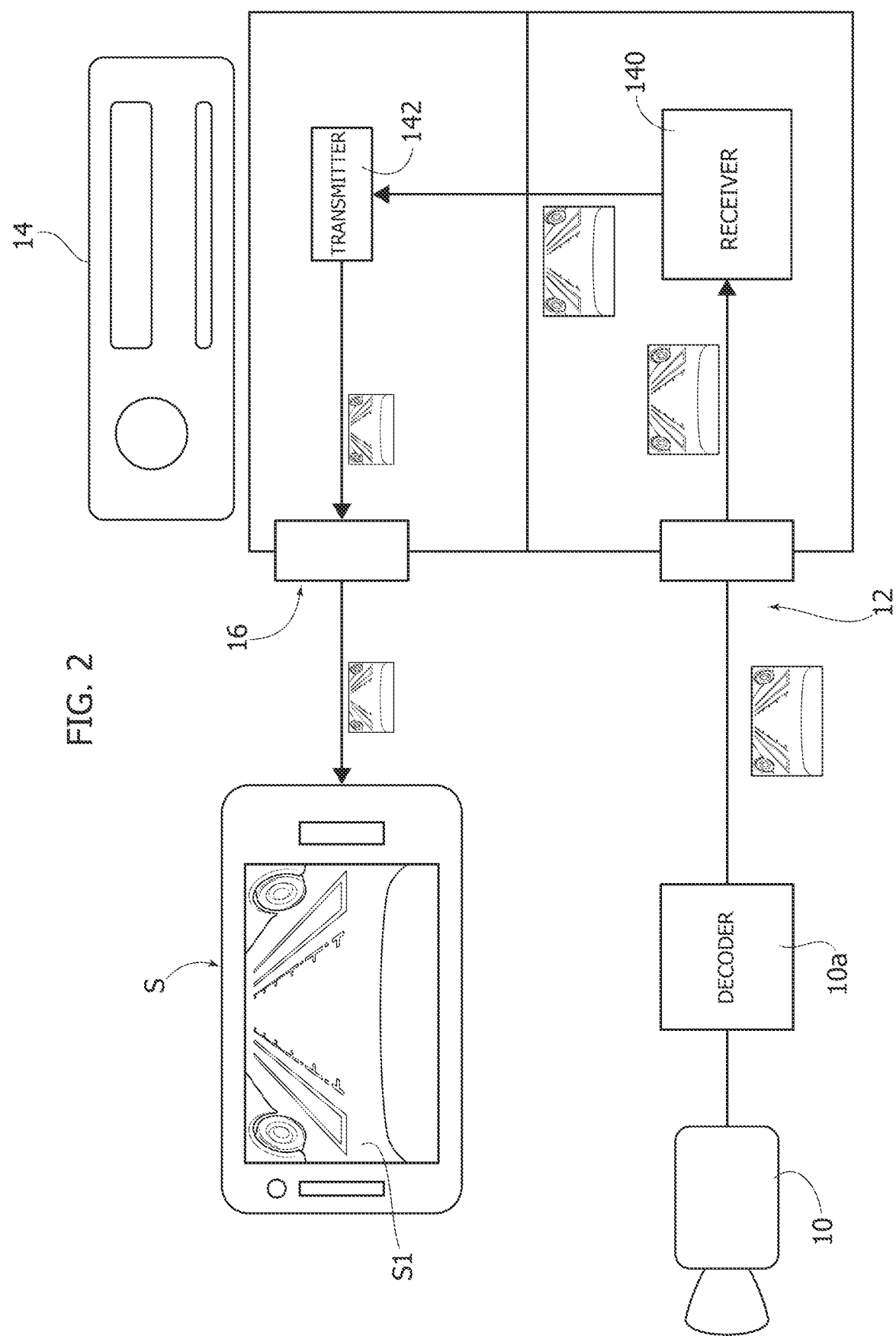
FIG. 2 is a block diagram exemplary of a system based on embodiments.

In one or more embodiments a circuit essentially corresponding to blocks 140 and 142 of FIG. 2 (including circuit elements providing interfacing with the connections 12 and 16) can be integrated into an otherwise conventional car radio 14, e.g. Accordo2™ as available with companies of the ST Group.

Accordo2™ is a family of devices that provide a cost effective microprocessor solution for modern automotive car radio systems, with an embedded powerful Digital Sound Processing subsystem, as well as a MIPS efficient ARM Cortex-R4 processor and an ARM Cortex-M3 controller dedicated for real-time CAN/Vehicle Interface Processing.

Accordo2™ family devices come with a set of common interfaces (UART/I2S/I2C/USB/MMC) which facilitates implementing a feature-rich system as well as a cost effective solution, bundled with a software package, which facilitates fast system implementation.

Accordo2™ family devices can manage an audio chain from analog or digital inputs to analog or digital outputs, including digital audio media decoding, sample rate conversion among various sources, intelligent routing and audio effects/DSP post processing. A flexible memory configuration facilitates implementing from very low cost systems based on real time OS, scaling up to demanding applications based on Linux OS.

Accordo2™ family devices are easily configurable in such a way that the vehicle being driven in reverse ("reversing") is detected to facilitate activation of the rearview camera system described (only) during reversing.

Figure 3:
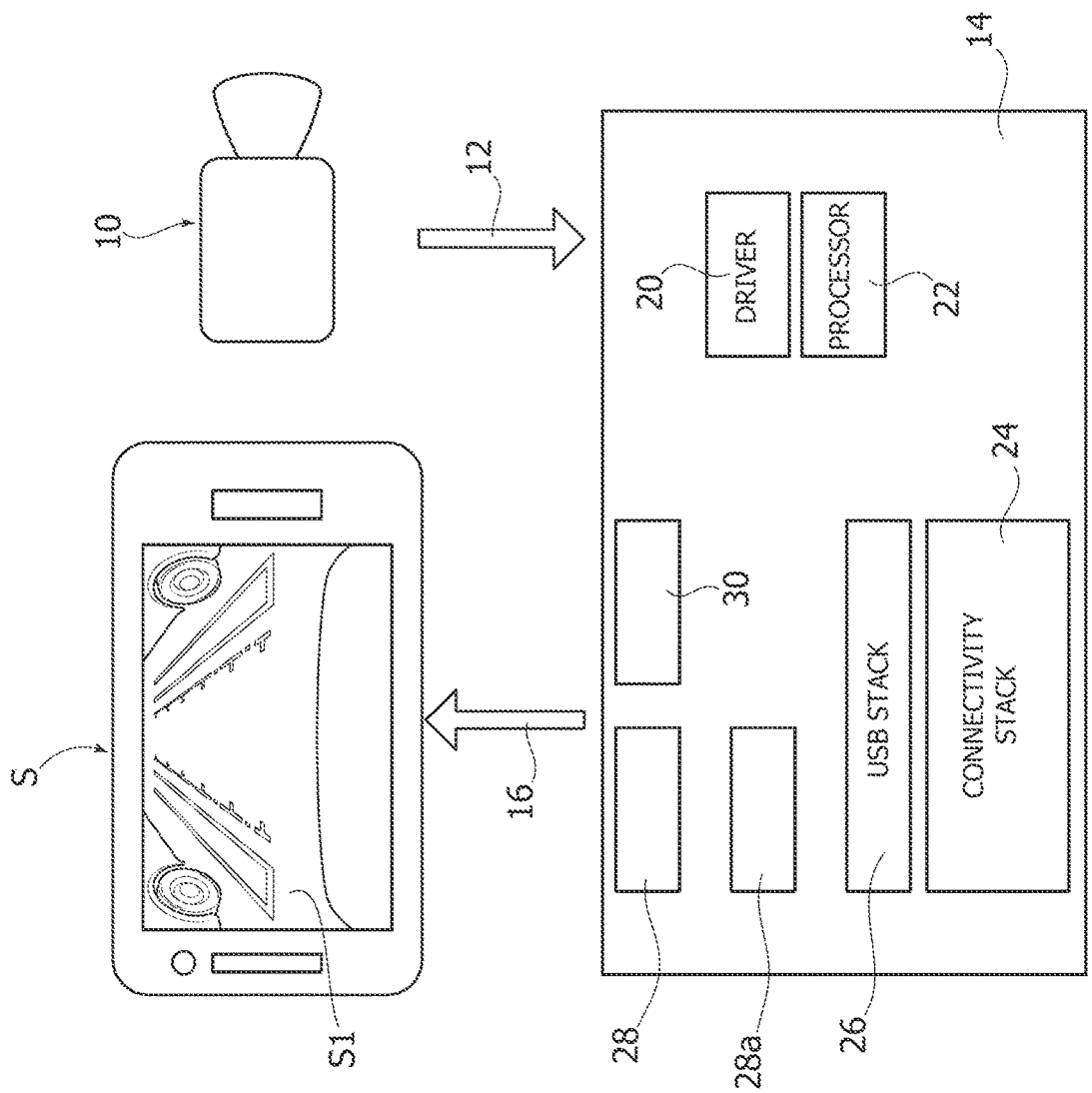
FIG. 3 is a block diagram exemplary of a system architecture based on embodiments.

The block diagram of FIG. 3 represents, in a complementary way to the system block diagram of FIG. 2, a possible software architecture of one or more embodiments adapted for implementation e.g. in Accordo2™ family devices.

Such architecture may provide a frame path from the camera 10 to the smart phone S such that video frames from the camera 10 can be received at the radio 14 over the connection 12 e.g. via a video input port (VIP) driver 20 and processed (e.g. STGLib) at 22.

A smartphone connectivity stack 24/USB stack 26 can be exploited to sent the images form the camera 10 to the smart phone (or another screen-equipped device) S over the connection 16 (e.g. a USB connection).

Protocol features between the smart phone S and the radio 14 can include both EAP 28 (over iAp—28*a*)—for iOS devices—and AOA 30—for Android devices.

A method according to one or more embodiments may include:
  providing a rearview camera (e.g. 10) on a vehicle (e.g. a motor car V) equipped with a radio equipment (e.g. 14),
  receiving (e.g. at 12) video frames from the rearview camera at the radio equipment,
  transmitting (e.g. at 16) video frames received at the radio equipment from the rearview camera to a mobile communication device (e.g. S) equipped with a video screen (e.g. S1), wherein video frames from the rearview camera are displayed on the video screen of the mobile communication device.

One or more embodiments may include:
  sensing at the radio equipment the vehicle reversing (that is, being driven in reverse), and
  transmitting video frames received at the radio equipment from the rearview camera to the mobile communication device for display on the video screen thereof as a result of vehicle reversing being sensed at the radio equipment.

In one or more embodiments a system may include:
  a rearview camera for mounting on a vehicle equipped with a radio equipment, and
  the radio equipment configured for receiving video frames from the rearview camera at the radio equipment and transmitting video frames received at the radio equipment from the rearview camera to a mobile communication device equipped with a video screen.

One or more embodiments may include the radio equipment configured for sensing the vehicle reversing and transmitting video frames received at the radio equipment from the rearview camera to a mobile communication device for display on the video screen thereof as a result of vehicle reversing being sensed at the radio equipment.

One or more embodiments may include a wired connection between the rearview camera and the radio equipment.

In one or more embodiments the radio equipment may include a WiFi or USB transmitter configured for transmitting to a mobile communication device video frames received from the rearview camera.

A circuit according to one or more embodiments for inclusion in vehicle (e.g. car) radio equipment may include:
  a video signal receiver circuit block (e.g. 140) configured for receiving video signals conveying video frames from a vehicle rearview camera,
  a video signal transmitter circuit block (e.g. 142) configured for transmitting to a mobile communication device equipped with a video screen said video signals received at said video signal receiver circuit block.

In one or more embodiments, the circuit may be configured for sensing the vehicle reversing and transmitting said video signals to a mobile communication device as a result of vehicle reversing being sensed at the radio equipment.

In one or more embodiments, a kit (e.g. for retro-fitting purposes) may include a rearview camera as well as radio equipment for mounting on a vehicle, the radio equipment including:
  a video signal receiver circuit block configured for receiving video signals conveying video frames from said rearview camera mounted on said vehicle,
  a video signal transmitter circuit block configured for transmitting to a mobile communication device equipped with a video screen said video signals received at said video signal receiver circuit block.

One or more embodiments may include a vehicle (e.g. motor car) equipped (as OEM feature or by way of retrofitting) with a system according to one or more embodiments.

Without prejudice to the underlying principles, the details and embodiments may vary, even significantly, with respect to what has been described by way of example only, without departing from the extent of protection.

The extent of protection is defined by the annexed claims.

The invention claimed is:

1. A method, comprising:
  sensing, by a radio receiver installed in a vehicle, a reverse movement of the vehicle through a wired connection;
  receiving video frames from an after-market installed rearview camera of the vehicle activated in response to the sensing by the radio receiver, the rearview camera and the radio receiver being separate and spaced apart from one another;
  processing the video frames with a graphic accelerator;
  compressing the video frames with a compressor after processing the video frames with the graphic accelerator;
  activating a rearview camera application on a mobile communication device in response to the sensing by the radio receiver; and
  transmitting the compressed video frames to a mobile communication device to be displayed on a video screen of the mobile communication device.

2. A system, comprising:
  an after-market rearview camera mounted on a rear portion of a vehicle and configured to be activated only during reversing;
  an analog video decoder coupled to the rearview camera;
  an after-market radio receiver installed in the vehicle, the radio receiver communicatively coupled to the analog video decoder, the rearview camera and the radio receiver being separate and spaced apart from one another,
  the radio receiver including:
  a video signal receiver configured to receive video data from the rearview camera;
  a graphic accelerator coupled to the video signal receiver and configured to generate YUV frames in response to the received video data;
  a compressor coupled to the graphic accelerator and configured to output compressed YUV frames;
  a video signal transmitter block configured to transmit the compressed YUV frames to a mobile communication device using a protocol specific to the mobile communication device.

3. The system of claim 2, wherein the radio receiver is further configured to, in response to being activated only during reversing, transmit a first activation signal to activate the rearview camera.

4. The system of claim 3, wherein the radio receiver is further configured to, in response to being activated only during reversing, transmit a second activation signal to activate a rearview camera application on the mobile communication device.

5. The system of claim 2, further comprising a wired connection between the rearview camera and the radio receiver.

6. The system of claim 5, wherein the wired connection includes a control area network of the vehicle.

7. The system of claim 2, wherein the after-market radio receiver includes a Wi-Fi transmitter or a USB transmitter configured to transmit the video data to the mobile communication device.

8. The system of claim 2, wherein the after-market radio receiver is further configured to transmit an activation signal to the mobile communication device in response to the after-market radio receiver sensing the vehicle has been placed in the reverse gear.

9. A device, comprising:
   an after-market vehicle radio receiver installed in a vehicle, including: a video signal receiver circuit configured to receive video signals including video frames from an after-market rearview camera installed in the vehicle, the rearview camera and the video signal receiver circuit being separate and spaced apart from one another; and
   a video signal transmitter circuit configured to transmit to a mobile communication device equipped with a video screen a video signal based on the video signals received at the video signal receiver circuit,
   wherein the vehicle radio receiver is configured to receive a first activation signal in response to the vehicle being in reverse, is configured to activate the rearview camera in response to the first activation signal, and is configured to transmit a second activation signal to the mobile communication device in response to the first activation signal to activate a rearview camera application installed on the mobile communication device, the vehicle radio receiver being further configured to:
   receive video frames from the rearview camera in response to the activating the rearview camera;
   convert the video frames with a graphic accelerator;
   compress the converted video frames with a compressor;
   transmit the compressed video frames to the mobile communication device.

10. The vehicle radio receiver of claim 9, further configured to receive the first activation signal over a control area network of the vehicle.

11. A kit, comprising:
    an after-market installed rearview camera coupled to a rear portion of a vehicle and configured to capture video frames; and
    an after-market installed radio equipment mounted in the vehicle, the radio equipment coupled to the rearview camera and configured to:
    sense that the vehicle is in reverse;
    activate the rearview camera in response to the sensing that the vehicle is in reverse;
    activate a rearview camera application installed on a mobile communication device having a video screen;
    receive the video frames from the rearview camera in response to the activating the rearview camera;
    convert the video frames with a graphic accelerator;
    compress the converted video frames with a compressor;
    transmit the compressed video frames to the mobile communication device, wherein the rearview camera and the radio equipment are separate and spaced apart from one another.

12. The kit of claim 11 further comprising a support bracket configured to be attached to a passenger compartment of the vehicle, the support bracket configured to hold the mobile communication device.

13. The kit of claim 11, wherein the after-market installed rearview camera is configured to be attached to a rear bumper of the vehicle.

14. The kit of claim 11, wherein at least one of the after-market installed rearview camera or the after-market installed radio equipment is configured to be attached to a control area network of the vehicle.

* * * * *